Aug. 11, 1970   O. PÜHRINGER   3,523,714
BEARING ARRANGEMENT FOR TILTABLE CRUCIBLES OR CONVERTERS
Filed Nov. 16, 1966

INVENTOR
OTHMAR PÜHRINGER
BY
HIS ATTORNEYS

United States Patent Office 3,523,714
Patented Aug. 11, 1970

3,523,714
BEARING ARRANGEMENT FOR TILTABLE CRUCIBLES OR CONVERTERS
Othmar Pühringer, Linz, Austria, assignor to Vereinigte Osterreichische Eisen- und Stahlwerke Aktiengesellschaft, Linz, Austria, a company of Austria
Filed Nov. 16, 1966, Ser. No. 594,719
Claims priority, application Austria, Oct. 11, 1966, A 9,498/66
Int. Cl. F16c 1/24
U.S. Cl. 308—5    5 Claims

ABSTRACT OF THE DISCLOSURE

A bearing arrangement for tiltable crucibles or converters having diametrically opposed trunnions includes a first pendulum roller bearing assembly that is fixed against axial displacement relative to its support, and a second pendulum roller bearing fitted in a slidable cylindrical sleeve so as to be axially displaceable with respect to its support.

---

Figure 1:
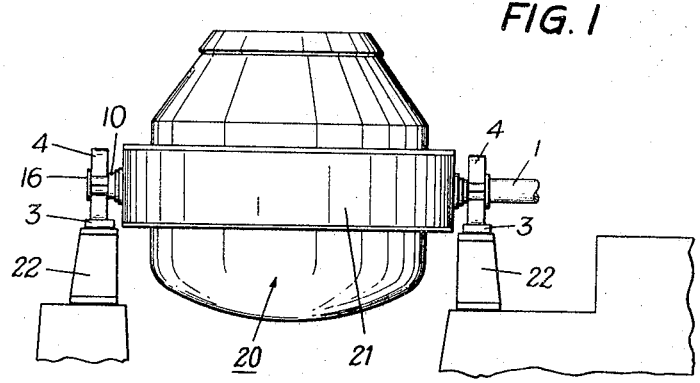

The invention relates to a bearing arrangement for tiltable crucibles or converters having diametrically opposite trunnions. Such crucibles are used for producing steel from hot metal by means of top-blown oxygen. In order to rationalize the production of steel, there is a trend towards increasing the holding capacity of crucibles or converters to the highest possible value. Converters are already known today which are able to hold 300 metric tons of liquid metal. Accordingly, the demands which have to be made upon the bearing arrangement of such crucibles or converters are numerous and not easily fulfilled. Firstly, it is required that the bearing arrangement accommodates the high radial stresses. A further demand regards the exact alignment of the trunnions. According to experience, large converters, due to the large distance between bearings, show misalignments which are caused by production tolerances, inexact mounting, load deformations, and thermal deformations. A satisfactory bearing arrangement has to provide the possibility for the bearing to follow the movements of the trunnions. If an elastic deformation occurs, it can usually be compensated by one single adjustment. Plastic deformations, however, lead to "cranking" of the trunnions, which the bearing has to compensate for with every turn. Further requirements which have to be fulfilled by a bearing arrangement result from longitudinal displacements in axial direction and axial stresses arising therefrom: Due to the temperature differences present in a converter, longitudinal displacements in axial direction result, having an order of magnitude of between 20 and 40 mm. dependent upon the size of the converter. In order to be able to accommodate these displacements, the bearing arrangement must have an expansion bearing which is adapted to keep the stresses resulting from the longitudinal displacement under control, and thus eliminates the danger of the bearing arrangement being damaged. In this connection, it must also be taken into account that it must be possible to accommodate the longitudinal displacement in axial direction during the rotating movement as well as during a standstill. A further demand upon bearing arrangements is that they must be able to accommodate horizontal stresses. This is necessary because, with the most frequently built drive consisting of a gear suspended on the driving trunnion, the bearing arrangement is subjected to additional stresses due to cog pressure and the reaction of support of the transmission, respectively, said stresses having a horizontal component. Thermal influences have to be compensated. It is therefore necessary that the bearing play or the bearing fit are accurately dimensioned with regard to the temperature to be expected, that perfect lubrication is made possible and that there is enough space left for an eventual cooling of the trunnions. Finally, one of the most important demands made upon a dependable bearing arrangement is that in case of damage the bearing must be easily exchangeable. Thus, a divided bearing has to be used, at least on the drive side.

A large number of bearing arrangements for crucibles or converters has become known; however, it has so far not been possible to combine all the aforementioned functions within one bearing arrangement. In a known bearing arrangement the trunnions were supported in a cylinder roller bearing encased in a globular housing, said globular housing being capable of rolling along the bearing surface. Although this bearing has, in principle, stood the test, it was found that misalignments of the trunnions and longitudinal displacements in axial direction were not accommodated in the best possible way. Axial displacement of the cylinder roller bearings, given favorable sliding conditions, is only possible during a rotating movement, but not during a standstill of the converter, and the rolling on the housing base also occasionally leads to difficulties, because the rolling bases will become dirtied and can only inadequately be lubricated.

Other known constructions used pendulum roller bearings, which, though they were well suited for accommodating angular movements of the trunnions (compensating for misalignments of the trunnions), do not allow for a longitudinal displacement of the trunnions in axial direction. In order to enable an axial displacement, additional appliances had to be used, i.e., either a rocking arrangement of the bearing stanchion or a bearing housing bridging means resting on slider or roller guide shoes upon a suitable substructure. This has the disadvantage that, when the converter is in operation, violent vibrations are transmitted to these movable parts and thus the converter cannot be kept steady and the necessary stability and robustness of the bearing arrangement is diminished.

The present invention has as its object to avoid the mentioned disadvantages and difficulties. It starts out from a bearing arrangement for tiltable crucibles or converters having diametrically opposite trunnions supported in pendulum roller bearing cartridges, one bearing being arranged as a fixed bearing to be axially indisplaceable and the other as an expansion bearing to be axially displaceable, and one or both trunnions being connected to a gear, and is characterized in that the cartridge of the expansion bearing is fitted in a slidable cylindrical sleeve or bushing to be axially displaceable relative to the bearing housing.

Preferably, the cylindrical sleeve is displaceable relative to a protecting bushing rigidly connected to the housing, said protecting bushing being made of a harder material than the sleeve.

Suitably, antirotation means, preferably consisting of axially arranged grooves and fitting keys, is provided between protecting bushing and the slidable cylindrical sleeve.

Figure 2:
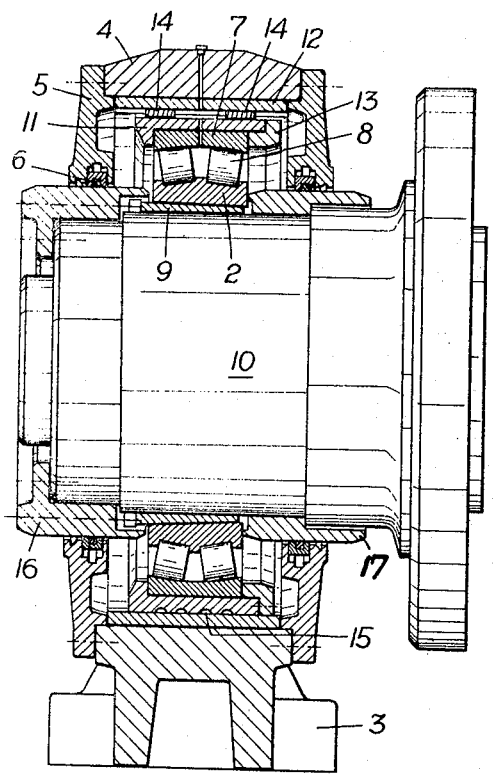
Figure 3:
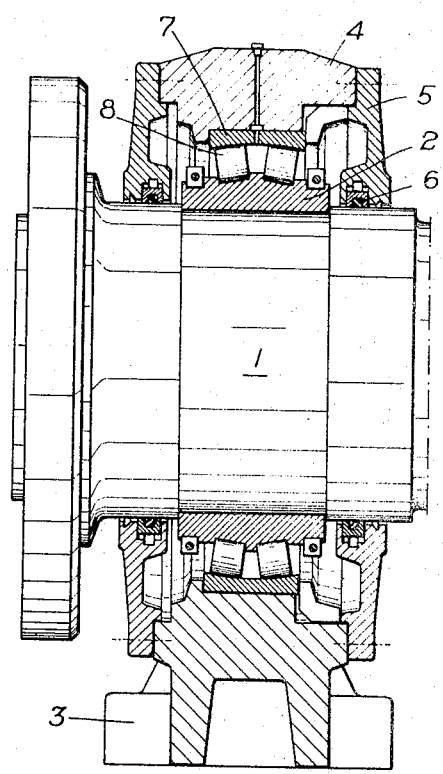

The invention is illustrated by way of an embodiment in the drawing. FIG. 1 shows an overall side view of a tiltable crucible or converter with its bearing arrangement; FIG. 2 shows the expansion bearing; and FIG. 3 shows the fixed bearing.

In FIG. 1, the converter or crucible 20 is supported in the carrier ring 21 having trunnions arranged opposite to each other, the bearings being mounted on stanchions 22.

Turning first to the fixed bearing (FIG. 3), numeral 1 denotes the trunnion supported in the fixed bearing. The inner ring 2 of the pendulum roller bearing is fixed on the trunnion, e.g., mounted with a tight fit. The housing comprises the housing base 3, the housing lid 4 and the side lids 5, said side lids being sealed against the trunnion by packings 6. The outer ring 7 having a concave inner surface is axially indisplaceably supported in the base and the lid of the housing. The rollers 8 of the pendulum roller bearing are arranged between the inner and the outer ring, the two rings and the rollers constituting the pendulum roller bearing cartridge. They effect a self-alignment of the bearing, when the trunnion forms an angle with the bearing axis because of load pressure or thermal stresses.

The trunnion of the expansion bearing according to FIG. 2 is denoted by 10. Here, also, a bearing housing, comprising a base 3, a lid 4 and side lids 5 with packings 6, is provided. The inner ring 2 of the pendulum roller bearing is fixedly mounted on the trunnion 10 by means of a conical clamping sleeve 9. Instead of using a clamping sleeve, the ring with a cylindrical bore might also be mounted directly on the trunnion, as shown in FIG. 3. The outer ring 7, which together with the inner ring 2 and rollers 8 constitute pendulum roller bearing cartridge of the expansion bearing, is inserted into a slidable cylindrical sleeve 11 which is slidable axially of the trunnion relative to a protecting bushing 12 mounted in the base part and in the lid, respectively. The protecting bushing 12 is suitably made of a harder material than the cylindrical sleeve unit and may be easily exchanged or repaired by projection welding, whenever this is necessitated by wear.

In order that the slidable cannot be rotationally displaced relative to the protecting bushing, an antirotation means is provided, which comprises axially extending grooves 13 and fitting keys 14 inserted therein. Peripherally extending grooves 15 are provided to permit introduction of a lubricant. Numeral 16 denotes an annular front lid mounted on the end of the trunnion which also provides an additional fastening for the inner ring 2. Numeral 17 denotes a counter-ring near the mounting plate of the trunnion.

Self-alignment of the expansion bearing, when the trunnion leaves the bearing axis because of load-pressure or thermal stresses, is accomplished the same as described with respect to the fixed bearing. The alignment is effected around the bearing center in the trunnion axis. Therefore, the bearing does not undergo any displacement and, as a consequence, any additional stresses resulting from the adjustment are minimized. In addition, as evident from the described arrangement, the expansion bearing may be axially displaced by the trunnion with its rings 16, 17, the inner ring 2 mounted thereon, the roller set 8, the outer ring 7 and the 11 sliding axially relative to the protecting bushing in a manner similar to that of a piston in a cylinder. Because of this arrangement, the axes through the working centers of the counter force due to friction and of the axial displacement force acting on the bearing are close together, so that the tilting moment, which is dangerous for any axial guiding, is kept to a minimum.

What is claimed is:

1. A bearing arrangement for tiltable metallurgical crucibles or converters having diametrically opposite trunnions rotatively supported on respective stationary stanchion means, comprising a bearing housing on each of said stanchions, a first pendulum roller bearing cartridge supporting one of said trunnions within the housing on its respective stanchion and fixed against axial displacement with respect thereto, a slidable cylindrical sleeve in the housing on the other of said stanchions, and a second pendulum roller bearing cartridge supporting the other of said trunnions, said second bearing cartridge being fitted in said slidable cylindrical sleeve to be axially displaceable relative to the housing on said other stanchion.

2. A bearing arrangement as set forth in claim 6 wherein a protecting bushing made of harder material than the slidable cylindrical sleeve forms part of said displaceable bearing housing to provide a sliding surface for said slidable cylindrical sleeve.

3. A bearing arrangement as set forth in claim 6 wherein a protecting bushing made of harder material than the slidable cylindrical sleeve forms part of said displaceable bearing housing to provide a sliding surface for said slidable cylindrical sleeve, antirotation means being provided between said protecting bushing and said slidable cylindrical sleeve.

4. A bearing arrangement as set forth in claim 6 wherein said displaceable bearing housing comprises a protecting bushing, said slidable cylindrical sleeve being axially displaceable along said protecting bushing, an antirotation means consisting of axially extending grooves and fitting keys being provided between said protecting bushing and said slidable cylindrical sleeve.

5. A bearing arrangement as set forth in claim 6 wherein peripheral lubricating grooves are provided between said slidable cylindrical sleeve and a protecting bushing rigidly mounted on the trunnion-facing surface of said displaceable bearing housing.

References Cited

UNITED STATES PATENTS

| 2,423,973 | 7/1947 | Halford | 308—35 |
| 2,556,317 | 6/1951 | Cook | 308—176 X |
| 2,719,763 | 10/1955 | Bamford | 308—176 |
| 2,976,090 | 3/1961 | McFeaters | 308—207 |
| 3,197,005 | 7/1965 | Ashton et al. | 308—176 X |
| 3,291,541 | 12/1966 | Dellinger | 308—6 |

CARROLL B. DORITY, JR., Primary Examiner

U.S. Cl. X.R.

266—36; 308—15, 35, 176

PO-1050
(5/69)

UNITED STATES PATENT OFFICE
CERTIFICATE OF CORRECTION

Patent No. 3,523,714          Dated Aug. 11, 1970

Inventor(s) Othmar Pühringer

It is certified that error appears in the above-identified patent and that said Letters Patent are hereby corrected as shown below:

Col. 1, line 53, "mm." should be --mm,--. Col. 2, line 56, after "Suitably," --an-- should be inserted. Col. 3, line 27, "unit" should be --11--; line 30, after "slidable" insert --cylindrical sleeve--; line 52, before "11" insert --cylindrical sleeve--. Claims 2, 3, 4 and 5, first line of each, "claim 6" should read --claim 1--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents